Aug. 13, 1940.                G. SLAYTER                 2,210,958
                   BREATHING MEANS FOR PIPE INSULATION
                          Filed July 14, 1937
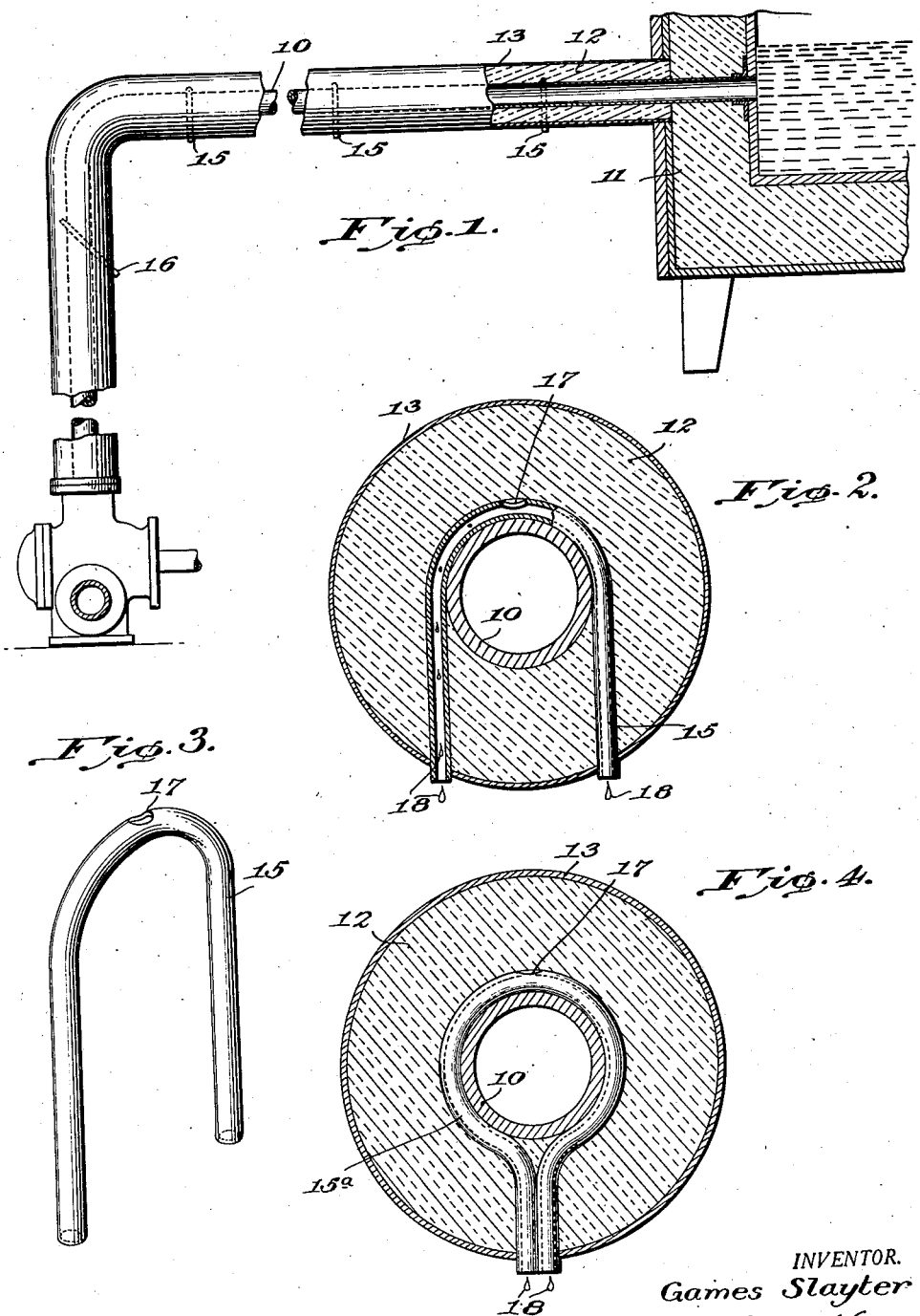
INVENTOR.
Games Slayter
BY Rule & Hoge,
ATTORNEYS.

Patented Aug. 13, 1940

2,210,958

UNITED STATES PATENT OFFICE 2,210,958

BREATHING MEANS FOR PIPE INSULATION

Games Slayter, Newark, Ohio, assignor, by mesne assignments, to Owens-Corning Fiberglas Corporation, a corporation of Delaware Application July 14, 1937, Serial No. 153,616

3 Claims. (Cl. 138—64)

My invention relates to a method and means for preventing condensation of moisture on the surfaces of insulated cold pipes or the like and within the surrounding insulation. A serious difficulty in connection with cold pipe insulation relates to the condensation of moisture in the porous or fibrous insulating material surrounding the pipes. This condensation is a result of the so-called breathing action which takes place during differential temperature variations. Intermittent or periodic changes in the temperature of the pipe cause a corresponding fluctuation in the temperature of the surrounding air within the porous insulating material. The expansion and contraction of the air thus produced results in a pumping or breathing action whereby comparatively warm atmospheric air is drawn into the insulation and cooled below the saturation point so that moisture is condensed on the surface of the cold pipe and in the surrounding insulation.

Heretofore efforts toward the elimination of such condensation have been directed to the development of a moisture-proof and air-tight seal between the insulation and the atmosphere so as to stop the breathing of moisture laden air into the insulation during the cycle of heating and cooling. For example, one method of procedure was to pack the insulation so tightly that air could penetrate it only with the greatest difficulty. Another was to build up concentric layers of insulation around the pipe, each one sealed as tightly as possible against leakage. Still another method was to spiral the insulation onto the pipe so that any air entering would have to follow the spiral in order to reach the pipe surface.

None of these methods has proved to be entirely successful. They at most delay the entrance of the air into the insulation for perhaps a few months or at most for a year or two, and it then becomes necessary to renew the insulation. Moreover, these previous methods have proved to be very expensive both from an investment and operative standpoint. They have not been effective for the intended purpose as it has proved to be practically impossible to seal the insulation in a manner to prevent at least a small amount of air leaking into the insulated region and depositing its load of moisture therein. Moreover, the temperature of the pipe is often low enough to cause the condensed moisture to freeze on the pipe. Ice thus accumulates and tends to push the insulation away from the pipe, destroying the insulation.

An object of the present invention is to provide a practical means for overcoming the above difficulties by preventing condensation of moisture within the insulating material.

A further object of the invention is to provide a novel method and means permitting a free breathing action in response to fluctuations in the temperature and at the same time dehydrate the air just before it comes in contact with the cold pipe or insulating material.

A feature of the invention consists in utilizing the low temperature of the pipe itself as a means for effecting such dehydration of the entering air.

Other objects of the invention will appear hereinafter.

Referring to the accompanying drawing:

Fig. 1 is a fragmentary part sectional elevation of an apparatus including an insulated cold pipe and means for preventing condensation of moisture within the insulating material;

Fig. 2 is a cross section on a larger scale of the insulated pipe and a breathing tube;

Fig. 3 is a perspective view of the breathing tube; and

Fig. 4 is a view similar to Fig. 2 showing a modified form of breathing tube.

As shown in Fig. 1, a pipe 10 which may be made of iron or other metal, opens into a tank 11 containing brine or other liquid which may be pumped through or caused to flow within the pipe 10. The pipe is surrounded with insulating material 12 which may be any conventional or approved material, usually an open porous or fibrous material. Surrounding and covering the insulating material is a sheet or layer 13 of moisture-proof sealing material.

In accordance with the present invention, breathing tubes 15 are arranged at intervals along the horizontal section of the pipe 10 and similar breathing tubes 16 are applied to the vertical portions of the pipe. These breathing tubes are made of copper or other metal which is a good heat conductor. As shown in Fig. 2, the breathing tube is in the shape of an inverted U and extends around and in contact with the upper half of the pipe 10. The two legs of the tube extend vertically downward through the insulation 12 and protrude beyond the cover 13. The tube is open at both ends and is also provided with an opening 17 preferably at the highest point in the tube.

It will be seen that with this construction the air is permitted to flow freely through the tube 15 and opening 17. This prevents the building up of a pressure differential between the insulating zone and the surrounding air so that leakage through the cover 13 is prevented. In other words any air drawn into the insulation passes through the tube 15. This tube being in direct contact with the cold pipe 10, causes the temperature of the air entering the tube to be lowered so that moisture therein is condensed within the tube and runs out in drops 18. The air is thus dehydrated and condensation of moisture within the insulating material 12 and on the surface of the pipe is prevented. The tubes 15 are located at sufficiently short intervals along the pipe to permit the free distribution of the air pressure throughout the insulating material.

The tubes 16 applied to the vertical section of the insulated pipe are arranged at an acute angle to the pipe, the legs of the tube being downwardly and outwardly inclined so that any moisture condensed therein is carried downward by gravity and discharged at a point outside of the insulation.

Fig. 4 illustrates a modified form of breathing tube 15ª. In this form the tube is shaped to contact with the pipe 10 through approximately its entire circumference, the end portions of the tube being brought together. This arrangement provides for a somewhat greater or more effective cooling action. However, the construction shown in Fig. 2 ordinarily provides a sufficiently rapid cooling of the air to effectively remove excess moisture and prevent any condensation after the air enters the insulating material.

Modifications may be resorted to within the spirit and scope of my invention.

I claim:

1. The combination of a cold pipe and a body of porous insulating material surrounding and embedding the pipe, means for extracting heat from the pipe and from the surrounding medium through the pipe, and a tube open to the atmosphere, extending within the body of insulating material and circumferentially of the pipe in immediate proximity thereto and opening into the surrounding insulation, whereby air entering said tube is subjected to the cooling and dehydrating influence of the cold pipe before said air can enter the porous insulation.

2. The combination of a cold pipe and a body of porous insulating material surrounding and embedding the pipe, means for extracting heat from the pipe and from the surrounding medium through the pipe, a tube open to the atmosphere, extending within the body of insulating material and circumferentially of the pipe in immediate proximity thereto and opening into the surrounding insulation, whereby air entering said tube is subjected to the cooling and dehydrating influence of the cold pipe before said air can enter the porous insulation, and sealing means surrounding the insulation and sealing it against the free entrance of atmospheric air to the insulation, whereby any air entering the insulation due to breathing action is directed through said tube.

3. The combination of a cold pipe, a body of porous insulating material surrounding and embedding the pipe, means for extracting heat from the pipe and from the surrounding medium through the pipe, and a breather tube extending from a point exterior to said insulation through the body of insulation into contact with and along the cold pipe, said tube being open to the atmosphere and open to said insulating material at a point interiorly thereof, said tube being arranged to extend downward from said interior point through the insulating material and open at its lower end to the atmospheric air, whereby moisture condensation within the tube is discharged by gravity to the outside air.

GAMES SLAYTER.